P. B. GANZINOTTI.
IMITATION PEARL.
APPLICATION FILED MAR. 31, 1917.
1,254,791.
Patented Jan. 29, 1918.
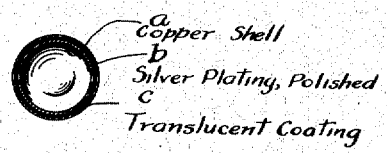
Inventor
Paul B. Ganzinotti
By his Attorney

UNITED STATES PATENT OFFICE.

PAUL B. GANZINOTTI, OF NORTH BERGEN, NEW JERSEY, ASSIGNOR TO JOSEPH H. MEYER BROS., OF NEW YORK, N. Y., A CORPORATION OF NEW YORK.

IMITATION PEARL.

1,254,791. Specification of Letters Patent. Patented Jan. 29, 1918.

Application filed March 31, 1917. Serial No. 159,046.

*To all whom it may concern:*

Be it known that I, PAUL BENJAMIN GANZINOTTI, a citizen of the United States, and a resident of North Bergen, in the county of Hudson and State of New Jersey, have invented a new and useful Improvement in Imitation Pearls, of which the following is a specification.

The invention is an improvement in imitation pearls, more especially, imitation gem pearls used for necklaces and other forms of jewelry, the object being to produce an article of good appearance and durable character and one which can be sold at a low price. Heretofore artificial pearls have been made by means of fish scale luster incorporated with a gelatinous or cellulosic varnish, in combination with a glass base. My invention requires neither the glass base nor the fish scale. I use in place of the glass base a bright metallic surface, preferably a fine silver surface, because of the high reflecting power of that metal when polished. In place of the hitherto indispensable fish scale mixture, I use a cellulosic varnish, colored white and having its optical density increased by the addition of a small amount of chalk, magnesia, zinc oxid, or in fact any other fine white powder or pigment that will produce a milky translucence. The light reflected from the bright white metallic surface pasing outward through the coating of milky translucent varnish gives rise to an appearance similar to that of the natural pearl, but without the necessity of employing any fish scale or a nacreous material. By eliminating the use of fish scale I am able to produce a much cheaper pearl, because the fish scale luster has always been a very expensive item in the manufacture of artificial pearls.

My mode of procedure is as follows:

I make or provide myself with a hollow white metallic bead of the form of the pearl desired, and polish it as bright as possible, preferably to a mirror finish. I also prepare a cellulosic varnish, as by dissolving collodion in sufficient amyl acetate to make a fairly fluid paste, and to this I add a small quantity of a white coloring material, such as chalk, magnesia, zinc oxid, or any other suitable white powder or pigment. It is not possible to state quantities in terms of precise measurement, because the amount of powder is very small, a mere pinch to a substantial amount, say a fluid ounce, of the varnish being sufficient, and because definite proportions are immaterial. Enough is added to give the coating when formed a milky translucence, more or less being used according to the appearance desired. I then coat the bright white metal bead with this mixture, either by painting or by dipping. One or more coats may be applied, depending upon the size of the bead and the density of the solution. Where there are more than one coat, each is allowed to dry before the next is put on, but one coat is sufficient and is preferable to two. In this way I obtain a faithful imitation of the natural pearl, which is impervious to water and perspiration, which will stand wearing and abuse, and is cheap to manufacture.

The bead is preferably one having a body of base metal and a true plating of silver. The metal surface should be not only highly polished but dense, because, the pearly effect being dependent upon reflection, any porosity or defects in the reflecting surface would give rise to apparent dark spots in the finished article. For these reasons a rolled plating is desirable.

The drawing represents a section through an imitation gem pearl made in accordance with the invention, the thickness of the layers being necessarily exaggerated, and no special attempt being made to show proportions.

*a* is the copper or other body of the bead, *b* its plating of silver, which is highly polished, and *c* the milky translucent coating. The manner of making hollow metal beads with rolled plating is well known, and consequently need not be described.

By the use of anilin dyes I can tint the varnish to imitate any particular kind of tinted or colored pearl. For some colored pearls it may not be necessary that the material added to increase the optical density of the coating be white, though I believe it better in all instances to use a white powder as before stated.

I do not necessarily limit myself to the production of imitation gem pearls, since the polished white metal base to which the coating is applied may be of other shapes or characters. Thus, the invention may be extended to the manufacture of articles and surfaces, such as buttons, toilet set handles, buckles and dress ornaments, commonly made of mother-of-pearl.

In some instances coatings of other specific compositions may be employed, but a cellulosic varnish is especially advantageous both for appearance and because it is waterproof and thereby protects the silver mirror beneath from discoloration, which would destroy the appearance of the "pearls."

I am aware that it has been proposed to make artificial pearls with actual pearl material ground up and made into a coating; but my invention is distinguished in requiring no nacreous substance of any kind and in relying wholly upon reflection through a cellulosic varnish rendered milky by a small amount of an indifferent white pigment, such as zinc oxid.

What I claim as new is:

1. An imitation pearl comprising a metal bead having a dense highly polished silver surface, and a translucent coating of substantially non-nacreous composition comprising a cellulosic varnish and a small amount of added material to increase its optical density and to give it the desired color and appearance by virtue of the light rays reflected through the coating from the mirror-like surface beneath.

2. An imitation pearl comprising a metal bead having a dense highly polished silver surface, and a translucent coating thereon comprising a cellulosic varnish containing a small amount of white pigment.

3. An imitation pearl comprising a metal bead having a dense highly polished silver surface and a translucent coating thereon comprising a cellulosic varnish containing a small amount of zinc oxid.

PAUL B. GANZINOTTI.